(12) United States Patent
Inagaki et al.

(10) Patent No.: US 8,883,309 B2
(45) Date of Patent: Nov. 11, 2014

(54) SILICATE-BASED BLUE LIGHT-EMITTING PHOSPHOR AND METHOD FOR PRODUCING SAME

(75) Inventors: Toru Inagaki, Ube (JP); Masato Yamauchi, Ube (JP); Seiji Noguchi, Ube (JP); Kouichi Fukuda, Ube (JP); Akira Ueki, Ube (JP)

(73) Assignee: Ube Material Industries, Ltd., Ube-shi, Yamaguchi (JP)

( * ) Notice: Subject to any disclaimer, the term of this patent is extended or adjusted under 35 U.S.C. 154(b) by 0 days.

(21) Appl. No.: 13/641,314

(22) PCT Filed: Apr. 14, 2011

(86) PCT No.: PCT/JP2011/059272
§ 371 (c)(1),
(2), (4) Date: Feb. 6, 2013

(87) PCT Pub. No.: WO2011/129397
PCT Pub. Date: Oct. 20, 2011

(65) Prior Publication Data
US 2013/0244033 A1 Sep. 19, 2013

(30) Foreign Application Priority Data
Apr. 14, 2010 (JP) ................. 2010-093117

(51) Int. Cl.
*B32B 5/16* (2006.01)

(52) U.S. Cl.
USPC ............. 428/402; 75/313; 75/327; 75/228; 75/235; 501/108

(58) Field of Classification Search
USPC ............ 428/402; 75/313, 327, 228, 235; 501/108
See application file for complete search history.

(56) References Cited

U.S. PATENT DOCUMENTS

| 2003/0085853 A1 | 5/2003 | Shiiki et al. | |
|---|---|---|---|
| 2009/0021145 A1* | 1/2009 | Sakai et al. | 313/503 |
| 2009/0200945 A1* | 8/2009 | Okuyama et al. | 313/643 |
| 2009/0218926 A1* | 9/2009 | Shiraishi et al. | 313/486 |
| 2009/0230839 A1 | 9/2009 | Nakamura et al. | |

FOREIGN PATENT DOCUMENTS

| JP | 07-101722 | 4/1995 |
|---|---|---|
| JP | 2004-176010 | 6/2004 |
| JP | 2005-60670 | 3/2005 |
| JP | 2009-256596 | 11/2009 |
| WO | WO2007/091603 | * 8/2007 |
| WO | WO2007/135926 | * 11/2007 |
| WO | WO2007/139014 | * 12/2007 |

OTHER PUBLICATIONS

International Search Report, PCT/JP2001/059272, mailed Jul. 26, 2011.

* cited by examiner

*Primary Examiner* — Leszek Kiliman
(74) *Attorney, Agent, or Firm* — Nixon Peabody LLP; Jeffrey L. Costellia

(57) ABSTRACT

A blue light-emitting silicate phosphor favorably employable as a blue light-emitting source of a light-emitting apparatus which gives emission of a visible light upon irradiation of ultraviolet rays having a wavelength of 254 nm, such as ultraviolet rays emitted by a fluorescent lamp is produced by a method comprising calcining a powdery mixture comprising a magnesium oxide powder, an MeO source powder, a EuO source powder and a $SiO_2$ source powder, said magnesium oxide powder having a purity of 99.9 wt. % or higher and a BET specific surface area in the range of 3 to 60 $m^2/g$ and having been prepared by bringing a metallic magnesium vapor into contact with oxygen whereby oxidizing the metallic magnesium vapor.

6 Claims, No Drawings

United States Patent

US 8,883,309 B2

SILICATE-BASED BLUE LIGHT-EMITTING PHOSPHOR AND METHOD FOR PRODUCING SAME

FIELD OF THE INVENTION

The present invention relates to a blue light-emitting silicate phosphor particularly useful as the blue light-emitting source of a fluorescent lamp and a method favorably employable for producing the blue light-emitting silicate phosphor.

BACKGROUND OF THE INVENTION

As a blue light-emitting phosphor placed in a visible light-emitting apparatus for giving an emission of a visible light in response to irradiation of ultraviolet rays (wavelength: 254 nm) produced by discharge of mercury vapor in a fluorescent lamp, a blue light-emitting aluminate phosphor (BAM: (Ba, Eu)O.MgO.5Al$_2$O$_3$) is generally employed. However, the blue light-emitting BAM phosphor is apt to decrease its emission strength with the passage of time.

On the other hand, there has been known a blue light-emitting silicate phosphor having a formula of 3(Me,Eu)O.aMgO.bSiO$_2$, in which Me is an alkaline earth metal selected from the group consisting of Sr, Ca and Ba, "a" is a number in the range of 0.9 to 1.1, and "b" is a number in the range of 1.8 to 2.2. However, it is known that the blue light-emitting silicate phosphor generally gives an emission of strength lower than that of the emission produced by the blue light-emitting aluminate phosphor (BAM).

JP 2006-70187 A (Patent Publication 1) refers to a blue light-emitting silicate phosphor and describes that the strength of an emission given by the silicate phosphor in response to irradiation of vacuum ultraviolet rays of a wavelength of 147 nm is enhanced by incorporating a such element as Cu, Ga, Ge, As, Ag, Cd, In, Sn, Sb, Au, Hg, Tl, Pb and Bi into the silicate phosphor. In the working examples given therein, a blue light-emitting silicate phosphor is produced by calcining a powdery mixture comprising SrCO$_3$ (MeO source), MgCO$_3$ (MgO source), SiO$_2$ (SiO$_2$ source), Eu$_2$O$_3$ (EuO source), and NH$_4$Br (flux).

JP 2007-314644 A (Patent Publication 2) describes that a blue light-emitting silicate phosphor in which a portion of Mg is replaced with a metal selected from Groups 5 and 6 shows an improvement of emission strength, after the phosphor is irradiated with vacuum ultraviolet rays of a wavelength of 146 nm at a lapse of one hour and 24 hours. In the working examples given therein, a blue light-emitting silicate phosphor is produced by calcining a powdery mixture comprising a combination of barium carbonate and strontium carbonate (MeO source), basic magnesium carbonate (MgO source), silicon dioxide (SiO$_2$ source) and Europium oxide (EuO source).

SUMMARY OF THE INVENTION

As is described above, a number of studies have been made for the purpose of enhancing the emission strength of an emission given by a blue light-emitting silicate phosphor until now. However, the enhancement of strength of an emission given by irradiation with ultraviolet rays having a wavelength of 254 nm is still less than the strength of an emission given by the blue light-emitting BAM phosphor.

Accordingly, it is an object of the invention to provide a blue light-emitting silicate phosphor giving an emission of a more enhanced strength upon irradiation with ultraviolet rays of a wavelength of 254 nm.

The present inventors have made studies on the method for producing a blue light-emitting silicate phosphor by calcination of a powdery mixture comprising an MeO source powder, a EuO source powder, an MgO source powder and a SiO$_2$ source powder. As a result of the studies, the inventors have found that the blue light-emitting silicate phosphor gives an emission of an enhanced strength in response to irradiation with ultraviolet rays of a wavelength of 254 nm, if the a fine high purity magnesium oxide powder produced by bringing a metallic magnesium vapor into contact with oxygen so as to oxidize the metallic magnesium vapor or a fine high purity magnesium carbonate is used as the MgO source, and further an appropriate amount of a chlorine-containing compound is used as flux. The inventors have further found that the blue light-emitting silicate phosphor produced above can give an emission of strength of 1.1 times or more, as much as the strength of an emission given by the blue light-emitting aluminate phosphor (BAM), the emission being given when the phosphor is irradiated with ultraviolet rays of a wavelength of 254 nm.

Accordingly, the invention resides in a method for producing a blue light-emitting silicate phosphor having the following composition formula (I):

wherein Me is Sr or a mixture of Sr and either or both of Ca and Ba, x is a number in the range of 0.001 to 0.110, a is a number in the range of 0.9 to 1.1, and b is a number in the range of 1.8 to 2.2, which comprises calcining a powdery mixture comprising a magnesium oxide powder, an MeO source powder, a EuO source powder and a SiO$_2$ source powder, said magnesium oxide powder having a purity of 99.9 wt. % or higher and a BET specific surface area in the range of 3 to 60 m$^2$/g, in which the magnesium oxide powder has been prepared by bringing a metallic magnesium vapor into contact with oxygen whereby oxidizing the metallic magnesium vapor.

Preferred embodiments of the above-mentioned method of the invention are given below.

(1) The powdery mixture further comprises a chlorine-containing compound in an amount of 0.02 to 0.5 mol in terms of chlorine content per one mole of magnesium contained in the powdery mixture.

(2) The powdery mixture further comprises strontium chloride in an amount of 0.02 to 0.5 mol in terms of chlorine content per one mole of magnesium contained in the powdery mixture.

The invention further resides in a blue light-emitting silicate phosphor having the following composition formula (I):

wherein Me is Sr or a mixture of Sr and either or both of Ca and Ba, x is a number in the range of 0.001 to 0.110, a is a number in the range of 0.9 to 1.1, and b is a number in the range of 1.8 to 2.2, which emits a visible light in the wavelength region of 430-490 nm in response to irradiation with ultraviolet rays of a wavelength of 254 nm, said visible light showing a maximum emission strength of 1.1 times or more as much as a maximum emission strength of a visible light in the wavelength region of 430-490 emitted by a blue light-emitting phosphor upon irradiation with ultraviolet rays of a wavelength of 254 nm, said light-emitting phosphor having composition formula of (Ba$_{0.976}$, Eu$_{0.024}$)O.MgO.5Al$_2$O$_3$ having a mean particle diameter of 6.5 μm.

Preferred embodiments of the blue light-emitting silicate phosphor of the invention are described below.

(1) Me of the formula (I) is Sr.

(2) The silicate phosphor has a mean particle diameter in the range of 1.0 to 20 μm.

(3) The silicate phosphor obtained by any one of the methods described above.

EFFECTS OF THE INVENTION

The method of the invention enables to produce in industry a silicate phosphor emitting a blue light of markedly enhanced emission strength in response to irradiation with ultraviolet rays of a wavelength of 254 nm. Since the blue light-emitting silicate phosphor of the invention gives an emission of enhanced strength upon irradiation with ultraviolet rays of a wavelength of 254 nm, the silicate phosphor of the invention is favorably employable as a blue light-emitting source employed for a fluorescent lamp.

EMBODIMENTS FOR PERFORMING THE INVENTION

The blue light-emitting silicate phosphor produced by the method of the invention is represented by the following composition formula (I):

$$3(Me_{1-x}, Eu_x)O \cdot aMgO \cdot bSiO_2 \quad (I)$$

in which Me is Sr or a mixture of Sr and either or both of Ca and Ba, "x" is a number in the range of 0.001 to 0.110, "a" is a number in the range of 0.9 to 1.1, and "b" is a number in the range of 1.8 to 2.2.

In the formula (I), it is preferred that Me is Sr or a mixture of Ba and Sr. It is particularly preferred that Me is Sr. In the mixture of Ba and Sr, the content of Sr preferably is in the range of 3-6 moles, per one mol of Ba.

It is preferred that "x" is in the range of 0.010 to 0.070, "a" is in the range of 0.97 to 1.03, and "b" is in the range of 1.97 to 2.03.

The method of the invention for producing a blue light-emitting silicate phosphor can be performed using a magnesium oxide powder or a basic magnesium carbonate powder as the MgO source powder.

In the method using a magnesium oxide powder as the MgO source powder, the magnesium oxide powder should have a purity of 99.9 wt. % or higher and a BET specific surface area in the range of 3 to 60 m²/g, which is prepared by bringing a metallic magnesium vapor into contact with oxygen, so as to oxidize the metallic magnesium vapor (that is, vapor phase oxidation method). Thus, the magnesium oxide powder is a fine magnesium oxide powder having a high purity and a diameter (i.e., BET diameter) in the range of 0.028 to 0.56 μm, which is determined by calculation from the BET specific surface area according to the below-mentioned calculation formula. The magnesium oxide powder preferably has a BET specific surface area in the range of 5 to 45 m²/g, more preferably 5 to 20 m²/g.

BET diameter (μm)=6/[BET specific surface area (m²/g)×3.58 (g/cm³)]

In the above-mentioned formula, "6" is a surface shape coefficient, and "3.58 g/cm³" is a true density of magnesium oxide.

The magnesium oxide powder prepared by the vapor phase oxidation method comprises cubic primary particles and hence is hardly aggregated. Therefore, a powdery mixture comprising the magnesium oxide powder prepared by the vapor phase oxidation method as the MgO source powder can be a very uniform powder mixture in which the magnesium oxide powder is uniformly dispersed. Such uniform powdery mixture is converted into a blue light-emitting silicate phosphor having a uniform composition and giving an emission of enhanced strength.

Each of the source powders other than the MgO source powder, that is, MeO source powder, EuO source powder and SiO₂ source powder can be an oxide powder or a powder convertible into an oxide powder, such as a hydroxide powder, a halide powder, a carbonate powder, a nitrate powder, or an oxalate powder. Any of these source powders preferably have a purity of 99 wt. % or higher, more preferably 99.9 wt. % or higher, and preferably have a mean particle diameter in the range of 0.1 to 50 μm. In the specification, the mean particle diameter is determined by the known laser diffraction-scattering method.

To the powdery mixture can be added such an element as W, Pb or P, so that the resulting blue light-emitting silicate phosphor can give am emission of more enhanced strength. The element can be added to the powdery mixture in an amount of 0.01 to 0.2 mole per one mole of magnesium contained in the MgO source.

The powdery mixture can be calcined preferably in the form of a mixture of particles having a mean particle diameter of 10 to 80 μm. The mixture of particles having the indicated mean particle diameter can be prepared by mixing the source powders in an aqueous medium to produce an aqueous slurry and spray-drying the aqueous slurry.

The powdery mixture preferably contains a flux. The flux preferably is a chlorine-containing compound. The chlorine-containing compound is preferably contained in an amount of 0.02-0.5 mole, more preferably 0.1-0.5 mole, in terms of the chlorine content, per one mole of magnesium contained in the powdery mixture.

The chlorine-containing compound preferably is a chloride of a metal (Me, Eu, Mg) comprised in the blue light-emitting silicate phosphor. Examples of the chlorine-containing compounds include strontium chloride, magnesium chloride, and europium chloride. Preferred is strontium chloride.

The powdery mixture is preferably calcined in a reducing gas atmosphere. The reducing gas can be a mixture of a hydrogen gas of 0.5-5.0 vol. % and an inert gas of 99.5-95.0 vol. %. Examples of the inert gases include argon gas and nitrogen gas. The calcination is generally carried out at a temperature of 900-1,300° C., preferably a temperature of 1,050-1,250° C., most preferably a temperature of 1,100-1,230° C. The calcination is generally carried out for 0.5 to 100 hours.

In the case that the metal oxide source is a compound convertible into an oxide under heating, the powdery mixture comprising such metal oxide source is preferably heated to 600-850° C. for 0.5-100 hours in an atmospheric condition, prior to the calcination of the powdery mixture in the reducing gas atmosphere.

If desired, the blue light-emitting silicate phosphor produced by the calcination can be post-treated by, for example, classification, acid-treatment using a mineral acid such as hydrochloric acid or nitric acid, or baking.

In the method using a basic magnesium carbonate powder as the MgO source powder, the basic magnesium carbonate powder should have a purity of 99.9 wt. % or higher and a mean particle diameter in the range of 1 to 20 μm. The powdery mixture comprising the basic magnesium carbonate preferably contains a chlorine-containing compound as flux, in an amount of 0.2-0.5 mole in terms of the chlorine content, per one mole of magnesium contained in the powdery mixture. Other conditions are essentially the same as those adopted in the method using a magnesium oxide powder as the MgO source powder.

The methods described above can produce a novel blue light-emitting silicate phosphor which emits a visible light in the wavelength region of 430-490 nm upon irradiation with ultraviolet rays of a wavelength of 254 nm, said visible light showing a maximum emission strength of 1.1 times or more (preferably 1.3 times or more, and not more than 2.0 times, preferably not more than 1.8 times) as much as a maximum emission strength of a visible light in the wavelength region of 430-490 emitted by a blue light-emitting phosphor in response to irradiation with ultraviolet rays of a wavelength of 254 nm, said light-emitting phosphor having the composition formula of $(Ba_{0.976}, Eu_{0.024})O \cdot MgO \cdot 5Al_2O_3$ having a mean particle diameter of 6.5 μm. The "maximum emission strength" used herein means an emission strength of the highest peak of visible light in the wavelength region of 430 to 490 nm.

The blue light-emitting silicate phosphor of the invention preferably has a mean particle diameter in the range of 1.0 to 20 μm (determined by the laser diffraction-scattering method).

EXAMPLES

In the following examples and comparison examples, the maximum emission strength means a relative value which was calculated in relation to the maximum emission strength of a visible light in the wavelength region of 430-490 emitted by the blue light-emitting aluminate BAM phosphor (i.e., $(Ba_{0.976}, Eu_{0.024})O \cdot MgO \cdot 5Al_2O_3$ having a mean particle diameter of 6.5 μm) upon irradiation with ultraviolet rays of a wavelength of 254 nm.

Example 1

A strontium carbonate powder ($SrCO_3$, purity 99.99 wt. %, mean particle diameter 2.73 μm), a strontium chloride powder ($SrCl_2$, purity 99.99 wt. %), a magnesium oxide powder (MgO, prepared by the vapor phase oxidation method, purity 99.98 wt. %, BET specific surface area 8 $m^2/g$, BET diameter 0.20 μm), a silicon dioxide powder ($SiO_2$, purity 99.9 wt. %, mean particle diameter 3.87 μm), and an europium oxide powder ($Eu_2O_3$, purity 99.9 wt. %, mean particle diameter 2.71 μm) were weighed in a molar ratio of 2.860:0.125:1.000:2.000:0.150 ($SrCO_3:SrCl_2:MgO:SiO_2:Eu_2O_3$).

All of the prepared powders were placed in a ball mill together with pure water, and mixed for 24 hours, to produce a slurry of the powdery mixture. The slurry was spray-dried by means of a spray dryer, to obtain a powdery mixture comprising particles having a mean particle diameter of 40 μm.

The thus obtained powdery mixture was placed in an alumina crucible and calcined at 800° C. for 3 hours in an atmospheric gas. The calcined powdery mixture was cooled to room temperature, and then calcined at 1,200° C. for 3 hours in a reducing gas comprising hydrogen (2 vol. %) and argon (98 vol. %) to give a blue light-emitting silicate phosphor having the composition formula of $3(Sr_{2.995}, Eu_{0.005})O \cdot MgO \cdot SiO_2$. The resulting blue light-emitting silicate phosphor was sieved on a polyamide sieve (opening size: 20 μm) to remove large particles, and dried. The thus sieved blue light-emitting silicate phosphor had a mean particle size of 7 μm.

The sieved blue light-emitting silicate phosphor was processed to form a phosphor layer. The phosphor layer gave an emission of blue light having the maximum peak at a wavelength of 460 nm when it was irradiated with ultraviolet rays having a wavelength of 254 nm. The emission strength of the maximum peak was 1.35 times as much as that of the reference BAM phosphor.

Example 2

The procedures of Example 1 were repeated except that the temperature of calcining in the reducing gas atmosphere was changed to 1,100° C., to give a blue light-emitting silicate phosphor having a mean particle size of 4 μm. The blue light-emitting silicate phosphor was processed to form a phosphor layer. The phosphor layer gave an emission of blue light having the maximum peak at a wavelength of 460 nm when it was irradiated with ultraviolet rays having a wavelength of 254 nm. The emission strength of the maximum peak was 1.32 times as much as that of the reference BAM phosphor.

Example 3

The procedures of Example 1 were repeated except that the temperature of calcining in the reducing gas atmosphere was changed to 1,220° C., to give a blue light-emitting silicate phosphor having a mean particle size of 4 μm. The blue light-emitting silicate phosphor was processed to form a phosphor layer. The phosphor layer gave an emission of blue light having the maximum peak at a wavelength of 460 nm when it was irradiated with ultraviolet rays having a wavelength of 254 nm. The emission strength of the maximum peak was 1.34 times as much as that of the reference BAM phosphor.

Example 4

The procedures of Example 1 were repeated except that the magnesium oxide powder was replaced with a basic magnesium carbonate ($4MgCO_3 \cdot Mg(OH)_2 \cdot 4H_2O$, available from Aldrich Corp., purity 99 wt. %, mean particle size 13.5 μm) and that the strontium carbonate powder, strontium chloride powder, basic magnesium carbonate powder, silicon dioxide powder and europium oxide powder were mixed in a molar ratio of 2.860:0.125:1.00:0.20:0.0150 ($SrCO_3:SrCl_2:4MgCO_3 \cdot Mg(OH)_2 \cdot 4H_2O:SiO_2:Eu_2O_3$), to give a blue light-emitting silicate phosphor having a mean particle size of 9 μm. The blue light-emitting silicate phosphor was processed to form a phosphor layer. The phosphor layer gave an emission of blue light having the maximum peak at a wavelength of 460 nm when it was irradiated with ultraviolet rays having a wavelength of 254 nm. The emission strength of the maximum peak was 1.15 times as much as that of the reference BAM phosphor.

Comparison Example 1

The procedures of Example 4 were repeated except that the strontium chloride powder was not used and that the strontium carbonate powder, basic magnesium carbonate powder, silicon dioxide powder and europium oxide powder were mixed in a molar ratio of 2.985:1.00:2.00:0.0150 ($SrCO_3:4MgCO_3 \cdot Mg(OH)_2 \cdot 4H_2O:SiO_2:Eu_2O_3$), to give a blue light-emitting silicate phosphor having a mean particle size of 8 m. The blue light-emitting silicate phosphor was processed to form a phosphor layer. The phosphor layer gave an emission of a blue light having the maximum peak at a wavelength of 460 nm when it was irradiated with ultraviolet rays having a wavelength of 254 nm. The emission strength of the maximum peak was 0.9 time as much as that of the reference BAM phosphor. Thus, the emission strength of the maximum peak was slightly lower than that of the referential blue light-emitting BAM phosphor.

What is claimed is:

1. A method for producing a blue light-emitting silicate phosphor having the following composition formula (I):

$$3(Me_{1-x},Eu_x)O \cdot aMgO \cdot bSiO_2 \quad (I)$$

wherein Me is Sr or a mixture of Sr and Ca, x is a number in the range of 0.001 to 0.110, a is a number in the range of 0.9 to 1.1, and b is a number in the range of 1.8 to 2.2, which comprises calcining a powdery mixture comprising a magnesium oxide powder, one of a combination of $SrCO_3$ and $SrCl_2$ and a combination of $SrCO_3$, $SrCl_3$ and $CaCO_3$, a EuO source powder and a $SiO_2$ source powder, said magnesium oxide powder having a purity of 99.9 wt. % or higher and a BET specific surface area in the range of 3 to 60 $m^2/g$, in which the magnesium oxide powder has been prepared by bringing a metallic magnesium vapor into contact with oxygen whereby oxidizing the metallic magnesium vapor.

2. The method of claim 1, wherein $SrCl_2$ is contained in an amount of 0.02 to 0.5 mole in terms of chlorine content per one mole of magnesium contained in the powdery mixture.

3. The method of claim 1, wherein the powdery mixture is calcined in a reducing gas atmosphere comprising a mixture of hydrogen gas of 0.5-5.0 vol. % and an inert gas of 99.5-95.0 vol. %.

4. The method of claim 1, wherein the powdery mixture is calcined at a temperature of 900-1,300° C.

5. The method of claim 1, wherein the EuO source powder is an europium oxide powder.

6. The method of claim 1, wherein the $SiO_2$ source powder is a silicon dioxide powder.

* * * * *